Sept. 5, 1939.         R. SARDESON         2,171,895
                COMPENSATED BIMETAL THERMOSTAT
              Filed Feb. 23, 1937        2 Sheets-Sheet 1
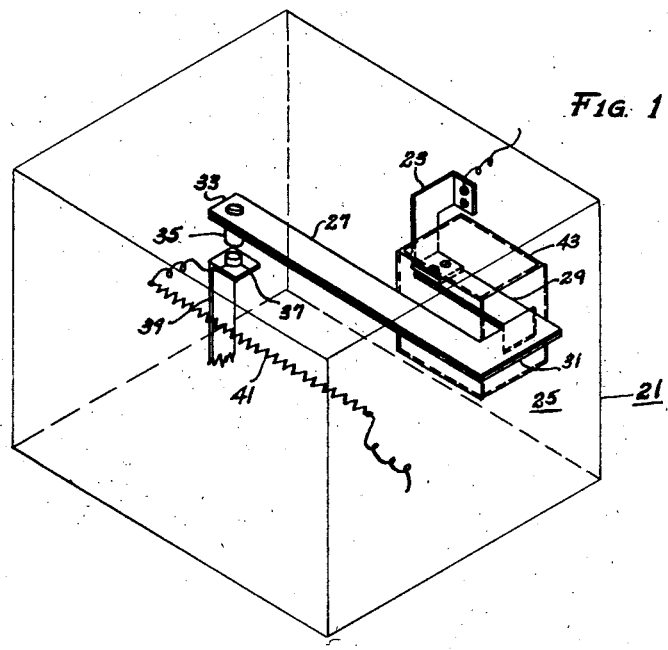
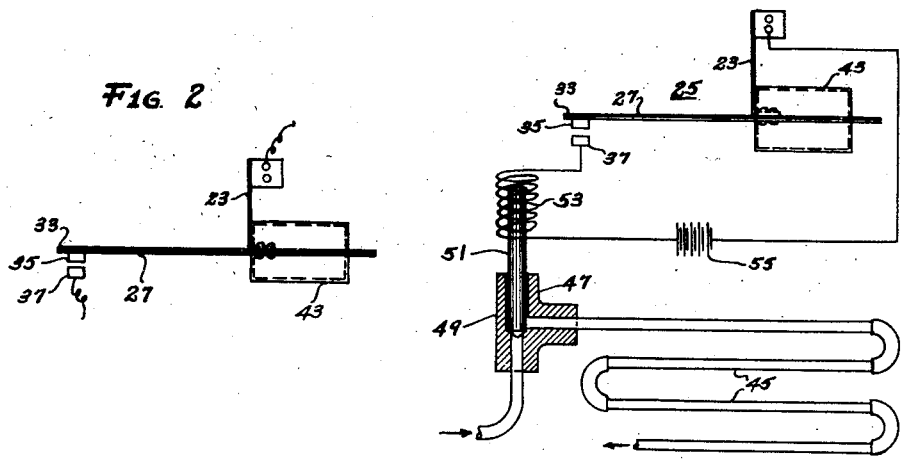
INVENTOR.
Robert Sardeson.
BY
ATTORNEYS.

Sept. 5, 1939.   R. SARDESON   2,171,895
COMPENSATED BIMETAL THERMOSTAT
Filed Feb. 23, 1937   2 Sheets-Sheet 2
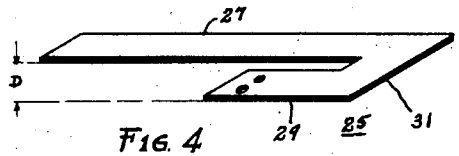
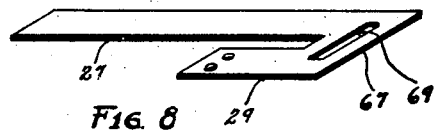
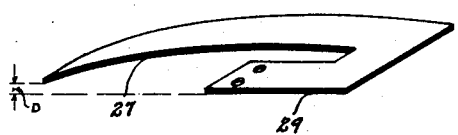
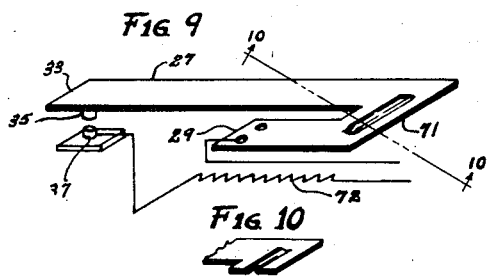
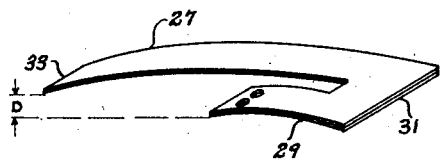
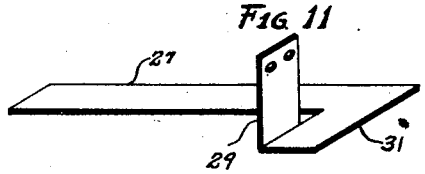
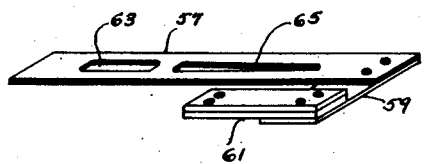
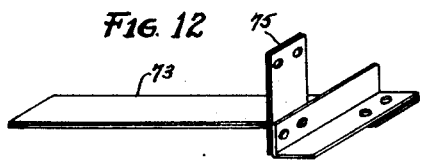
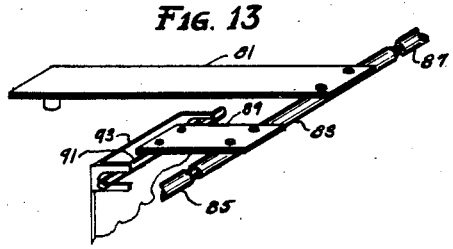
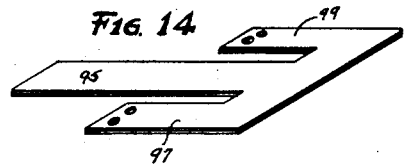
INVENTOR.
Robert Sardeson.
BY
ATTORNEYS.

Patented Sept. 5, 1939

2,171,895

UNITED STATES PATENT OFFICE 2,171,895

COMPENSATED BIMETAL THERMOSTAT

Robert Sardeson, Minneapolis, Minn., assignor to McGraw Electric Company, Chicago, Ill., a corporation of Delaware Application February 23, 1937, Serial No. 127,100

2 Claims. (Cl. 297—12)

My invention relates to thermostats and particularly to compensated bimetal thermostats.

An object of my invention is to provide a relatively simple, compact easily manufactured and efficient compensated bimetal thermostat structure.

Another object of my invention is to provide a bimetal thermostat in which the time lag of operation is greatly reduced.

Another object of my invention is to provide a unitary compensated bimetal thermostat that shall be adapted to reduce the temperature differential of operation to any desired degree.

Another object of my invention is to provide a unitary bimetal thermostat structure that is so designed and constructed as to cause little or no stress in the bimetal itself during manufacture thereof.

Another object of my invention is to provide a compensated bimetal thermostat structure in which the compensating portion receives its heat mainly by conduction from the main portion.

Another object of my invention is to provide a plural part bimetal thermostat in which one part is adapted to be located in one heat zone and another part is adapted to be located in another heat zone having a temperature differing from that of the first heat zone.

Other objects of my invention will either be apparent from a description of several forms of devices embodying my invention or will be pointed out in the course of such description.

In the drawings,

Figure 1 is a view illustrating schematically my device applied to the control of a room heater, Fig. 2 is a view, in side elevation, of my improved thermostat, Fig. 3 is a schematic view of my improved thermostat applied to the control of a refrigerating means, Fig. 4 is a view in perspective of my improved thermostat in normal position, Fig. 5 is a view in perspective, showing the shape of the thermostat in an intermediate condition of operation, Fig. 6 is a view in perspective, showing the final shape of the thermostat when fully operated, Fig. 7 is a view in perspective of a modified form of device embodying my invention, Fig. 8 is a view in perspective of another modification, Fig. 9 is a view in perspective of still another modification, Fig. 10 is a view in cross section taken on the line 10—10 of Fig. 9, Fig. 11 is a view of still another modification, Fig. 12 is a view in perspective of another modification, Fig. 13 is a view in perspective, of another modification, and, Fig. 14 is a view of still another modification.

Referring first of all to Fig. 1 of the drawings, I have there illustrated an enclosure 21 which is intended to represent schematically any device, or space, or room or other structure more or less enclosed, the temperature in which is to be controlled. In this particular case, enclosure 21 may be considered to represent a room, the temperature of the air in which is to be controlled.

A thermostat embodying my invention is adapted to be suitably supported within said room and for this purpose a bracket 23 may be secured by any suitable means to one of the side walls of said room. The bracket 23 may be made of metal and is preferably designed and constructed to have a relatively small mass. A plural part bimetal thermostat 25 having two portions or legs 27 and 29 of unequal length and an intermediate connecting portion 31 is adapted to be supported by the outer end of the shorter leg 29 from bracket 23 substantially as shown in Fig. 1 of the drawings. For purposes of clarity, the longer portion or leg 27 may be called the main portion and the shorter leg or portion 29 may be called the auxiliary or compensating portion, following the method of operation of the device as will be hereinafter more clearly set forth. It may be noted that Fig. 1 of the drawings illustrates the form of device at present preferred by me in which the three portions 27, 29 and 31 are integral with each other, cut, punched out, or otherwise obtained from a sheet of bimetal material of the usual kind, the method used being that which causes the least stress in the bimetal which might tend to deform it. The high expansion component is, say, the upper one of the two and I wish to particularly point out that the relative positions of the two components is the same in the main bar, the auxiliary bar and in the connecting portion.

The free or movable end 33 of the main bimetal bar may be provided with a contact member 35 thereon, which contact member is adapted to engage a control element for a temperature varying means. This control element in the present instance comprises an adjustable contact member 37 supported on a substantially fixed bracket 39 which contact member 37 may be connected either directly or through relay means with an electric heating element 41, whereby the energization of the heating element may be suitably controlled to maintain a substantially constant temperature of room or space 21.

I provide further a shroud 43 surrounding the auxiliary or compensating portion 29 for a purpose to be hereinafter set forth in greater detail.

Referring to Fig. 3 of the drawings, I have there illustrated the application of my improved bimetal thermostat to another form of temperature varying means including a refrigerator coil 45 represented schematically by a plurality of sections of pipe through which a refrigerating medium is adapted to circulate, the flow of this refrigerant being controlled by a valve 47 as shown schematically only. This valve includes a body 49 and a movable closure member 51 therein which member may be actuated electromagnetically by a suitable coil 53 in a manner well known in the art. The compensated bimetal thermostat 25 is adapted to control the energization of coil 53 by means of a circuit shown in Fig. 3 of the drawings and including a suitable source of supple of electric energy 55 here represented as a battery, but being usually in the form of an ordinary supply circuit.

I desire it to be understood that, for the purpose of simplification, the temperature varying means have been shown schematically only and that the size of the bimetal thermostat in Fig. 1 of the drawings is out of proportion to the dimensions of the enclosure, this having been done for the purpose of making the drawing more clear. The same remarks apply in general to the representations in Fig. 3 of the drawings.

Referring to Figs. 4, 5 and 6, I have there illustrated the operation of the compensated bimetal thermostat embodying by invention, Fig. 4 showing the device when all of the parts or portions thereof are in their normal or non-operated positions, so that the main, auxiliary and connecting portions are located in substantially the same plane. The distance D at the left of the figure will have a certain value which may be, say, three-eighths inch.

Upon being subjected to a variation of ambient temperature, which for the purpose of discussion may be considered to be a rise in temperature, the main bimetal bar 27 will flex first and may be assumed to move downwardly as shown in Fig. 5 of the drawings. This will of course, be true when the high expansion component of the bimetal thermostat is the one at the top of the thermostat as seen in Figs. 4, 5 and 6 and the thermostat is subjected to a rise in temperature. The distance D will be much less, say one-sixteenth inch.

It will be noted that the auxiliary bar 29 which, as has already hereinbefore been set forth, is the shorter of the two bars has not flexed to any substantial degree because of the location of the two bars as more clearly shown in Fig. 1 of the drawings. It will be noted in Fig. 1 of the drawings that the main bimetal bar is located closer to the heating means 41 than is the auxiliary bar so that its temperature will inherently be higher than that of the auxiliary bar 29. The presence of the shroud 43 aroung the auxiliary bar 29 will of course cause the temperature variation of the auxiliary bar to lag behind the temperature variation of the main bar. The mass of bracket 23 also acts to cause a time lag in the operation of the auxiliary bimetal bar. It is obvious that the mass of the shroud, if used, of the bracket, and the mass of the main and of the auxiliary bimetal bars must all be considered in the design of a thermostat of this kind.

Fig. 6 shows the bimetal bar in its final, fully operated shape, in which the compensating portion 29 has also flexed or warped around its support which, as has already been shown in Fig. 1 of the drawings, is at that end thereof away from the connecting portion 31. Since the high expansion component of the bimetal thermostat is on the same side in both bars, it is obvious that part 29 will flex in the same direction in which the main bar 27 has flexed. The result of the flexing of the auxiliary bimetal bar 29 in the same direction in which the main bar flexes is that the main bimetal bar and particularly the end 33 thereof will be caused to move in the reverse direction from that in which its temperature change caused it to move, or, stating it in other words, the action of auxiliary bar 29 in flexing around its support is to partially nullify the action of the main bimetal bar. The distance D is now greater than in Fig. 5 but is less than in Fig. 4. The main bimetal bar thus is adapted to flex around an initially substantially stationary support and this support is then adapted to be moved in the same general direction in which the free end of the main bar has moved, and if the free end of the main bimetal bar had engaged a substantially fixed control member with a certain pressure, the auxiliary bimetal bar acts to reduce this pressure to a predetermined degree which may be varied both as to time and intensity as will be hereinafter more fully described.

Referring now to Fig. 7 of the drawings, I have there illustrated a slightly different form of built up or composite bimetal thermostat having the same action. A main bimetal bar 57 has secured thereto at one end thereof a cross bar 59 which is made of a single metal only and which, in turn, has secured thereto a compensating or auxiliary bar 61. The high expansion component in bar 57 and in the shorter bar 61 are both on the upper side of the two bars so that the action of this composite or built up structure is the same as was set forth above for the structure shown in Figs. 4, 5 and 6. Means for obtaining an increase in sensitivity in bar 57 includes a plurality of openings 63 and 65 extending longitudinally of the bar, not only to increase the superficial surface of the bar which may be engaged by a medium surrounding it, but also to decrease the mass of the bar itself.

Fig. 7 illustrates a means which may be used in the auxiliary bimetal bar to increase the time lag of response of the auxiliary bar, as by making the auxiliary bar of greater mass, either by making the thickness of bimetal bar 61 greater than that of the main bar or by making its width greater than that of the main bar or a combination of both a greater thickness and a greater width. The use of this means may obviate the use of a shroud or a relatively heavy thermostat supporting bracket. Use of this means to secure a time lag, may call for the use of a compensating or auxiliary bimetal bar of a length equal to or greater than that of the main bar, in order to secure the desired amount of nullifying action, since the heavier or thicker auxiliary bimetal bar will have a lesser deflection than would a thinner bimetal bar.

Referring now to Fig. 8 of the drawings, I have there illustrated one means of varying the amount of heat which may be conducted from the main bimetal bar 27 to the auxiliary bimetal bar 29 through a connecting portion 67. This connecting portion may have an opening 69 therein which opening reduces the area of cross section of the heat path between the two bars. It is obvious that the size of openings 69 may be varied to be able to vary the amount of heat which may be conducted from one bar to the other in a given time.

Referring now to Figs. 9 and 10 of the drawings, I have there illustrated a modified form of connecting portion 71 which is provided with stiffening means extending longitudinally of its length in the form of a dent or fold as shown in cross section in Fig. 10 of the drawings.

Fig. 9 illustrates the use of a small auxiliary heating element 72 thermally associated with the compensating bimetal bar, which heating element is controlled by the thermostat. The use of an auxiliary electric heating element makes possible an accelerated compensating action of the auxiliary bimetal element to any desired degree. The auxiliary electric heating element may be used not only to reduce the time lag, but also to cause it to become negative, that is to cause the action of the auxiliary bimetal bar to precede that of the main bar. Obviously also the normal function of the auxiliary electric heating element may be reversed, that is it may be normally energized and upon being deenergized it will cause a cooling of the auxiliary bimetal bar and therefore an accelerated movement of the main bar.

Fig. 11 illustrates another form of unitary or integral bimetal bar comprising a main bar 27 and an auxiliary bar 29 which auxiliary bar is bent at right angles to the plane of the main bar 27 and the connecting portion 31. This may be desirable or necessary for purpose of mounting.

Still another modification of device embodying my invention is shown in Fig. 12 of the drawings which is a composite counter part of the device shown in Fig. 11. It includes a main bimetal bar 73 and auxiliary bimetal bar 75 and a connecting portion 77, of angle bar shape substantially as shown in this figure of the drawings. The high expansion component in bar 73 is on the upper surface thereof and the high expansion component in bar 75 is at its right hand surface so that the operation of this modification is substantially the same as was hereinbefore set forth for the device shown in Figs. 4, 5 and 6.

Referring to Fig. 13 of the drawings, I show a main bimetal bar 81 having one end secured to a rod 83 pivotally supported by suitable bearings 85 and 87. An auxiliary bimetal bar 89 has one end secured to bar 83 while its other end is supported in such manner as to preclude any movement in a direction at right angles to the plane of the two bimetal bars but to allow not only movement in the plane of the bar but also a slight turning movement as will occur when auxiliary bar 89 flexes. Thus the left hand end of bimetal bar 89 (as seen in Fig. 13) may be secured to a rod or bar 91 which may be supported by a fixed bracket 93 having slotted arms adapted to receive the rod 91. Any other equivalent thermostat supporting structure may be used, so long as it permits of the above described movements of the thermostat structure.

Referring now to Fig. 14, I have there shown a still further modification of device embodying my invention. A main bimetal bar 95 is integral with and between two auxiliary bimetal bars 97 and 99, the unconnected ends of which are adapted to be mounted on a suitable support in substantially the same manner as was set forth above for thermostat 25. The use of two auxiliary or compensating bimetal bars makes it possible to obtain operation responsive to three different heat zones and I may, if I so desire, locate both auxiliary bimetal bars at one side of the main bimetal bar.

The operation of the thermostat shown in Fig. 13 is substantially as follows, assuming that a source of heat is to be controlled: The main bar 81 may flex to move its free end downwardly and in due course the auxiliary bimetal element 89 will tend to flex, but since both of its ends are prevented from moving laterally of its normal plane its upper surface will become convex and the rod 91 will be moved slightly toward rod 83 and both rods 83 and 91 will turn slightly on their respective axes. The result is a counteracting or nullifying movement of the free end of main bar 81.

The structure shown in Fig. 14 is well adapted to an operating condition where a response is desired to three different temperatures as might be the case in a room heater where the temperature of the room, of the heat source and of the outside air are all to be taken into consideration by the thermostat.

It is well known in the art that irrespective of the smallness of the mass of a thermally-actuable element, this mass results in a lag in the response of the thermal element behind the change of temperature causing its action. This lag is the greater, the greater the rate of change of temperature. It is also obvious that since a certain strength is required in a thermal element, it must have a reasonable mass, which of course introduces an appreciable lag in its response. The result of this is that hunting or over-shooting of temperature occurs when a thermostat is used to control a temperature. That is if say it is desired to limit the temperature variations in a room to a range of 68° F. to 70° F., the temperature in the room may rise appreciably above the value of 70°, say to 71° or 72°, and may drop appreciably below 68°, say to 67° or 66°. This means that a simple bimetal bar will engage a control means associated with a temperature varying means with a greater pressure than is desirable or necessary and at the same time, while the average temperature may remain constant, the extreme of temperature may be too great. This of course introduces undesired stress in the bimetal bar which may, in the course of long periods of operation, cause its adjustment and response to vary.

It is further obvious that the same comments apply to a temperature varying means such as a refrigerating installation. The remarks made above as to over-shooting of the temperature are of course applicable to a still greater degree in those cases of scientific apparatus in which the permissible or at least desirable temperature range is very much smaller. I have reference for instance to bacteriological work where it may be desirable to maintain the temperature with not over a few tenths of a degree variation.

The device embodying my invention when applied to temperature control of this kind results in the maintenance of a much smaller extreme variation, because while the main bimetal bar is flexing in response to a temperature change, the auxiliary bimetal bar is also flexing with any desired degree of nullifying action and a time lag which can be made to have any desired value. The frequency of successive engagements with and disengagement from a control means, such as a contact member, is increased to thereby reduce the extreme variations of temperature and at the same time the pressure on the control means and the stress in the thermostat is reduced. A bimetal thermostat embodying my invention has a much greater sensitivity and only a small or negligible time lag of operation.

The operation of the auxiliary bimetal bar may be made to have any desired time relation to that of the main bimetal bar. Thus the use of an auxiliary heating element 72 as shown in Fig. 9 may cause the action of the auxiliary bar to precede that of the main bar while the location of the auxiliary bar in a zone of different temperature (a lower temperature in the case where the temeperature varying means is a source of heat) than is the main bimetal bar, causes the auxiliary bar to receive an appreciable portion of its heat by conduction from the main bimetal bar and thus cause its action to lag behind that of the main bar. The amount of this lag can be varied by a change in its mass, as shown in Fig. 7 or by a change in the size of opening 69 in cross bar 31, as shown in Fig. 8. Then too the size, shape, volume, material and position of the shroud 43 may be varied as may be found necessary or desirable to obtain a certain operating result.

The degree of the nullifying or compensating action may also be varied by changes in the length of the auxiliary bimetal bar 29, the shorter this arm the less being its nullifying action on the main bar. A bimetal thermostat embodying my invention thus operates in the same way as would a bimetal bar having little or no mass and following temperature changes with little or no time lag, an operating characteristic which is greatly desired.

While I may use structures such as shown in Figs. 7 and 12 of the drawings, I prefer the integral structures shown in Figs. 4, 5 and 6 for example because of the fact that the bimetal element is stressed to a much smaller degree in the manufacturing operations which it is necessary to use in order to make the device, than is the case for the devices shown in Figs. 7 and 12. It is well known that punching, drilling or welding have a tendency to destroy the operating characteristics of the bimetal when they are later subjected to temperature variations to which they are to respond.

I wish to here point out that my device distinguishes from other devices used commercially or shown in earlier patents in that it comprises a main bimetal bar and an auxiliary bimetal bar which extend parallel to each other in side-by-side relation, partially co-extensive, normally coplanar and that the high expansion component is on the same side of the two portions. The main bimetal bar is supported by the auxiliary bar so that the flexing movement of the main bimetal bar around its support and the movement of the support for the main bar caused by the flexing movement of the auxiliary bar around its support are in the same direction instead of in the opposite direction as is the case with some of the devices of the prior art with which I am familiar.

The thermostat embodying my invention is applicable to a wide variety of uses in the field of temperature control, by reason of its simplicity as to structure and manufacture, its effect in reducing time lag in response to temperature changes and preventing hunting or over-shooting of the temperature and in reducing mechanical stresses in the thermostat structure. It provides a very simple structure adapted to be made responsive to a main and one or more auxiliary or modifying temperature conditions. The effect of the auxiliary bimetal bar on the main bimetal bar can be varied within wide limits by the use of one or more of the means hereinbefore described.

Various modifications may be made in the device embodying my invention without departing from the spirit and scope thereof and I desire therefore that only such limitations shall be imposed thereon as are disclosed in the prior art or are set forth in the appended claims.

I claim as my invention:

1. A compensated bimetal thermostat consisting of a main and an auxiliary flat bimetal plate of substantially the same width extending in normally flat spaced side-by-side positions relative to each other, said auxiliary plate being of substantially less length than said main plate, the adjacent ends of said plates being connected by means of a bimetal cross plate, and means to support said thermostat solely from the free end of said auxiliary plate in definite heat receiving relation with a temperature varying means to first cause a movement of the free end of the main bar in a given direction and then a movement of the connected ends of both bars in said given direction to cause return movement of the free end of the main bar on change of temperature by said temperature varying means.

2. A bimetal thermostat adapted to be subjected to changes in ambient temperature caused by a temperature varying means and consisting of a main and an auxiliary bimetal bar and a cross bar rigidly connecting the adjacent ends of said main and said auxiliary bar and constituting therewith a member of substantially U-shape with normally coplanar flat arms, said auxiliary bar being substantially shorter than said main bar and means to support said thermostat at the free end only of the auxiliary bar relatively to a temperature varying means to position said bars at different distances from a temperature varying means with the main bar located in a temperature zone the temperature of which is more nearly equal to that of the temperature varying means than is the temperature of the zone in which the auxiliary bar is located.

ROBERT SARDESON.